(12) United States Patent
Wehrman et al.

(10) Patent No.: US 9,371,004 B2
(45) Date of Patent: Jun. 21, 2016

(54) INTERNAL VEHICLE TELEMATICS DATA ACCESS

(71) Applicant: Ford Global Technologies, LLC, Dearborn, MI (US)

(72) Inventors: Edward Wehrman, Leesburg, VA (US); Julius Marchwicki, Detroit, MI (US); Steven Bandy, Belleville, MI (US); Mark Wilson, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/487,653

(22) Filed: Sep. 16, 2014

(65) Prior Publication Data

US 2016/0075232 A1 Mar. 17, 2016

(51) Int. Cl.
*G01M 17/00* (2006.01)
*B60K 35/00* (2006.01)
*B60R 16/023* (2006.01)
*G07C 5/08* (2006.01)

(52) U.S. Cl.
CPC .............. *B60K 35/00* (2013.01); *B60R 16/023* (2013.01); *G07C 5/0841* (2013.01); *B60K 2350/1072* (2013.01)

(58) Field of Classification Search
CPC ....................................................... G06F 17/00

USPC ................ 701/117, 29.3, 31.3, 31.4; 709/217
See application file for complete search history.

(56) References Cited

U.S. PATENT DOCUMENTS

| | | | |
|---|---|---|---|
| 8,275,508 B1 | 9/2012 | Adams et al. | |
| 8,565,963 B2 | 10/2013 | Burke, Jr. et al. | |
| 2012/0078497 A1* | 3/2012 | Burke, Jr. ...................... | 701/300 |
| 2012/0226390 A1* | 9/2012 | Adams et al. .................... | 701/1 |
| 2013/0158778 A1* | 6/2013 | Tengler et al. ............... | 701/31.5 |

* cited by examiner

*Primary Examiner* — Luke Huynh
(74) *Attorney, Agent, or Firm* — Jennifer M. Stec; Brooks Kushman P.C.

(57) ABSTRACT

A nomadic device may connect to a vehicle computing system (VCS) and be configured to identify data element parameter information associated with a gauge to be displayed, capture, using a data bridge adapter connected to a vehicle network, an element of vehicle data according to the data element parameter information, and display, via the VCS, the gauge including the element of vehicle data formatted according to the data element parameter information. A VCS may be configured to receive filtered vehicle data from a telematics gateway configured to provide a subset of vehicle data provided over a vehicle network, receive vehicle data from a nomadic device in communication with a data bridge adapter configured to capture vehicle data provided over the vehicle network, and utilize the vehicle data to provide information via the VCS unavailable via the filtered vehicle data.

19 Claims, 5 Drawing Sheets

FIG. 5

INTERNAL VEHICLE TELEMATICS DATA ACCESS

TECHNICAL FIELD

This disclosure generally relates to use of internal vehicle telematics data for display by a vehicle telematics system.

BACKGROUND

Vehicle telematics systems may support various features, such as voice command recognition, navigation, and music playback. In some cases, the vehicle telematics systems may provide display of various vehicle information, such as current location, heating and cooling settings, and current audio source. However, certain vehicle information may be unavailable to the vehicle telematics system, and therefore may be unavailable for display.

SUMMARY

In a first illustrative embodiment, a system includes a nomadic device connected to a vehicle computing system (VCS) and configured to identify data element parameter information associated with a gauge to be displayed, capture, using a data bridge adapter connected to a vehicle network, an element of vehicle data according to the data element parameter information, and display, via the VCS, the gauge including the element of vehicle data formatted according to the data element parameter information.

In a second illustrative embodiment, a system includes a nomadic device connected to a vehicle computing system (VCS) and configured to capture, using a data bridge adapter connected to a vehicle network, a plurality of elements of vehicle data according to data element parameter information, associate the vehicle data with positional information, and store the vehicle data as a vehicle run.

In a third illustrative embodiment, a system includes a vehicle computing system (VCS) configured to receive filtered vehicle data from a telematics gateway configured to provide a subset of vehicle data provided over a vehicle network, receive vehicle data from a nomadic device in communication with a data bridge adapter configured to capture vehicle data provided over the vehicle network, and utilize the vehicle data to provide information via the VCS unavailable via the filtered vehicle data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle telematics systems may have access to a controlled, limited set of vehicle information, such as vehicle speed and engine revolutions per minute (RPM). In some implementations, the vehicle telematics components are walled-off from other vehicle systems and receive access to the set of vehicle information through a gateway or other interface. This may be done to provide a level of isolation between the telematics functionality and the system functionality of the vehicle. However, in some cases a driver may wish to access or visualize elements of vehicle data that are unavailable to the vehicle telematics system, such as accelerometer sensor information, engine power and torque information, cylinder head temperature or air-fuel ratio, as some examples.

A bridge or other interface may be included in the vehicle to allow applications of the vehicle telematics system to read and display vehicle information that has been walled-off from the vehicle telematics system. The bridge device may include a dongle or other connector configured to connect to an information port of the vehicle, such as to an On-Board Diagnostic (OBD-II) port. When the bridge device further connects to a mobile device in communication with the vehicle telematics system, the additional elements of vehicle data may be available for use by the telematics system.

A visualization application of the vehicle telematics system may be configured to make use of the additional elements of vehicle data. For example, the visualization application may be configured to allow for custom visualization of vehicle data by way of gauges provided for display by the vehicle telematics system. As another example, the visualization application may be configured to allow a user to log the vehicle data, link the data to location-based information, and save the vehicle data to a user account for later retrieval. The visualization application may be further configured to augment the captured vehicle data with additionally captured data, such as audio or video captured by the mobile device or captured or input to the bridge device. Using the stored data, a driver may be able to playback the captured vehicle run, view information (e.g., how much acceleration was pulled in a certain turn), or compare vehicle runs to determine whether vehicle performance modifications had a desired effect.

Figure 1:
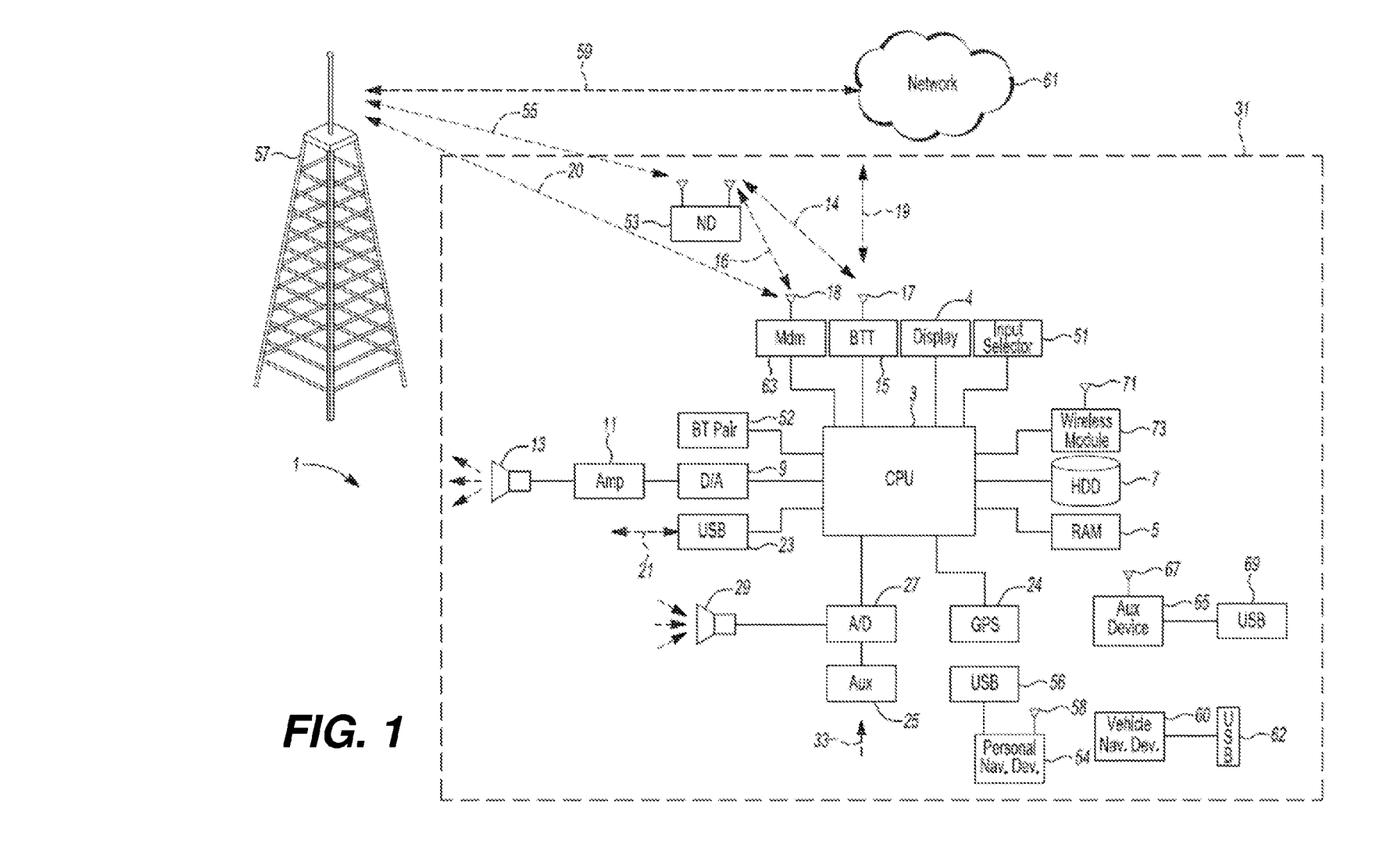
FIG. 1 is an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
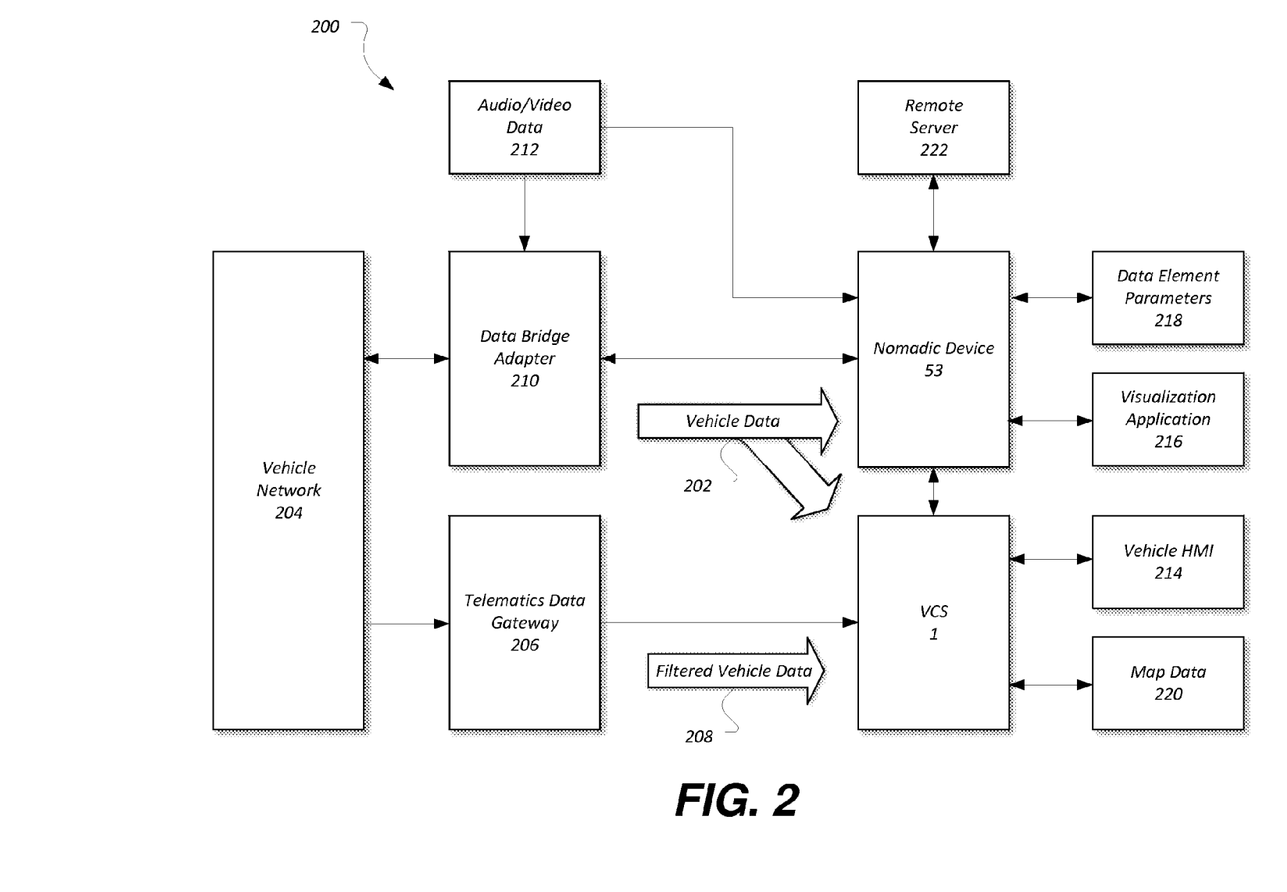
FIG. 2 illustrates an exemplary block diagram of a system including a data bridge adapter for providing detailed vehicle data from a vehicle network to a visualization application of the vehicle infotainment system.

FIG. 2 illustrates an exemplary block diagram 200 of a system including a data bridge adapter 210 for providing detailed vehicle data 202 from a vehicle network 204 to a visualization application 216 of the VCS 1. As illustrated, the data bridge adapter 210 is connected to the vehicle 31 via a vehicle port 204 to receive vehicle data 202. The data bridge adapter 210 is further in communication with a nomadic device 53 configured to communicate data to the VCS 1. The VCS 1 may be configured to provide a vehicle human-machine interface (HMI) 214 to the driver. The visualization application 216 may be an application installed to the nomadic device 53, and configured to provide enhanced data visualizations for vehicle data 202, such as custom gauges or position-based logging of vehicle data 202. It should be noted that the diagram 200 is exemplary, and other arrangements or combinations of elements may be used. As one possibility, the data bridge adapter 210 may be configured to provide a second path for data to the VCS 1 or another processing device integrated with the vehicle 31, rather than to the nomadic device 53 to provide to the VCS 1.

The vehicle data 202 may include information provided by vehicle modules and vehicle sensors regarding the status of the vehicle 31. As some examples, the vehicle data 202 may include information indicative of vehicle speed, yaw, pitch, roll, lateral acceleration, ambient temperature, accelerator pedal position, steering wheel angle, and vehicle position. The vehicle modules may include various vehicle 31 components, such as a powertrain control module (PCM), a brake system control module (BSCM), a body control module (BCM), and the VCS 1 itself. The vehicle sensors may include, as some examples, an acceleration sensor, a rain sensor, a hybrid battery voltage sensor, and a transmission fluid temperature sensor.

The vehicle network 204 may include various communications channels between vehicle devices. In an example, the vehicle port 204 may be a controller-area network (CAN) network. The vehicle modules may make use of the facilities of the vehicle network 204 to communicate among one another and with various vehicle systems. For example, the devices may be configured to communicate vehicle data 202 over the vehicle network 204.

The telematics data gateway 206 may be configured to connect to the vehicle network 204, to provide filtered vehicle data 208 to the VCS 1. The filtered vehicle data 208 may include a subset of the information available in the vehicle data 202, such as vehicle speed and engine RPM. The data bridge adapter 210 may further include hardware configured to interface with the VCS 1 to provide the filtered vehicle data 208 to the VCS 1.

The data bridge adapter 210 may also be configured to connect to the vehicle network 204, and may monitor the vehicle data 202 traversing the vehicle network 204. In an example, the data bridge adapter 210 may connect to the vehicle network 204 via an ODB-II diagnostic port (e.g., as a pass-through adapter connected to a user-accessible port). The data bridge adapter 210 may further include network hardware configured to facilitate communication with other devices of the system. For example, the data bridge adapter 210 may support one or more of Bluetooth, WiFi, and wired USB network connectivity to facilitate communication with the nomadic device 53. In some cases, the data bridge adapter 210 may be configured with audio or video inputs to receive audio or video data 212 for use by the VCS 1, or with audio or video capture functionality to capture audio or video data 212 for use by the VCS 1.

The vehicle HMI 214 may include various input hardware and output hardware serving to create a user interface for the driver and/or other vehicle occupants. Exemplary vehicle HMI 214 input hardware may include microphones for capturing audio input, and one or more user controls such as touch-screens, knobs or buttons (e.g., located on the vehicle dash, on the vehicle steering wheel, etc.). The vehicle HMI 214 may also include output hardware, such as one or more displays to provide visual output (e.g., a head unit touch-screen display, a display of the gauge cluster, etc.) and one or more speakers to provide audio output (e.g., via the vehicle 31 audio system).

The nomadic device 53 may include any of various types of computing devices, such as a personal computer or laptop, a personal digital assistant (PDA), a mobile phone, a tablet device, a microprocessor-based entertainment appliance, a peer-to-peer communication device or some other type of network-enabled device over which computing services may be provided. As one possibility, the nomadic device 53 may be an iPhone manufactured by Apple, Inc. of Cupertino, Calif. Similar to the vehicle HMI 214, the nomadic device 53 may include various input hardware and output hardware serving to create a user interface for the user. In some cases, one or more aspects of the user interface of the nomadic device 53 may be disabled when the nomadic device 53 is connected to the VCS 1 of the vehicle 31. For example, touch screen input to the nomadic device 53 may be disabled if the device is currently paired with and in communication with the VCS 1. To utilize the vehicle HMI 214, the nomadic device 53 may be configured to communicate with the VCS 1 over a connection between the VCS 1 and the nomadic device 53. The connection may include various wired and wireless data connections between the VCS 1 and the nomadic device 53 over which data may be transmitted. As one example, the connection may include a BLUETOOTH connection between the BLUETOOTH transceiver 15 of the VCS 1 and a BLUETOOTH module of the nomadic device 53. Additionally or alternately, the connection may include a USB connection between the USB input 23 to the VCS 1 and a USB connection to the nomadic device 53.

The visualization application 216 may be one example of an application or firmware program stored on a memory of the nomadic device 53 (e.g., as software, firmware, etc.). The visualization application 216 may be configured to utilize the data bridge adapter 210 to receive the vehicle data 202 from the vehicle network 204. The visualization application 216 may be configured to utilize data element parameters 218 to facilitate the identification and formatting of received elements of the vehicle data 202. As an example, for each element of vehicle data 202 configured for use by the visualization application 216, the data element parameters 218 may include a definition of where the element of vehicle data 202 appears in the vehicle data 202 (e.g., in what messages over the vehicle network 204 the element of vehicle data 202 appears, in what data format (e.g., bit representation, unit of measure, precision, scale, etc.) the element of vehicle data 202 appears, etc.) The data element parameters 218 may further include additional information regarding the element of vehicle data 202, such as a name for the element of use in a user interface, a range of values appropriate for the element, zero or more warning levels above or below which the user interface should display a warning for the element (e.g., an overheating condition), and unit of measure in which to present the element in a user interface (e.g., mph, ° F., seconds, etc.).

As one aspect, the visualization application 216 may be configured to allow a user to select from a listing of elements described by the data element parameters 218, to allow the user to display the current value of a selected element of vehicle data 202 in a format and scale appropriate for the selected element (e.g., as a vehicle gauge).

Additionally or alternately, the visualization application 216 may be configured to allow a user to log one or more elements of the vehicle data 202 over a vehicle 31 run, link the vehicle data 202 to location-based information, and save the vehicle data 202 to the vehicle 31 or remotely to a user account for later retrieval. For example, the visualization application 216 may receive an indication from the user of the start of a vehicle 31 run (e.g., via a button press, voice command, or other input to the vehicle HMI 214), and may begin capturing the vehicle data 202 until the visualization application 216 receives an indication from the user of the end of the vehicle 31 run (e.g., also via a button press, voice command, or other input to the vehicle HMI 214).

The visualization application 216 may be further configured to associate the captured vehicle data 202 with map data 220. The map data 220 may include information that may be queried to provide map information to a viewer of a display. The map data 220 may include, for example, information regarding roads that may be traversed by the vehicle 31 (e.g., location, name, endpoints, speed limit, traffic, etc.), as well as geographic features of the area surrounding the roadway (e.g., water, parks, desert, mountains, building outlines, etc.). In an example, the vehicle 31 may be configured to maintain the map data 220 in persistent storage 7 of the VCS 1. As one example, the vehicle 31 may load the map data 220, as needed, off a DVD. As another example, the vehicle 31 may maintain the map data 220 on flash or HDD storage. As yet a further example, the map data 220 may be maintained by the nomadic device 53 rather than by the VCS 1.

To perform the association, the visualization application 216 may be configured to monitor the current location of the vehicle 31 (e.g., as determined according to GPS information available to the visualization application 216) and associate the monitored current location information as well as current time information with the vehicle data 202. In some cases, the current time information may be the current time of day, while in other cases, the current time information may be an offset amount of time into the vehicle 31 run.

The visualization application 216 may be further configured to augment the captured vehicle data 202 with additionally captured data. In an example, the visualization application 216 may be configured to augment the captured vehicle data 202 with audio or video data 212 captured by the nomadic device 53. In another example, the visualization application 216 may be configured to augment the captured vehicle data 202 with audio or video data 212 captured by or input to the data bridge adapter 210.

In some cases, the visualization application 216 may be further configured to utilize elements of the vehicle data 202 to augment the association of location information with the vehicle data 202. For instance, as GPS positional data may be updated by the vehicle 31 at a relatively slower rate than the capture rate of the vehicle data 202 traversing the vehicle network 204, vehicle speed, heading, and/or acceleration information may be utilized by the visualization application 216 when associating locations with the vehicle data 202 to allow for greater precision than what might otherwise be available according to the GPS data. For example, between GPS updates the visualization application 216 may estimate a current vehicle location from the previous GPS location update and the heading and speed of the vehicle since the previous GPS location update.

The visualization application 216 may be configured to display the map data 220 and the captured vehicle data 202 via the HMI 214 of the vehicle 31 (e.g., via display 4). As an example, the visualization application 216 may be configured to identify a path along the road segments of the map data 220 from the start location of the vehicle 31 run to the end location of the vehicle 31 run. The visualization application 216 may be further configured to display the captured vehicle data 202 in the HMI 214 of the vehicle 31, such as by way of a highlighted path on the displayed map data 220.

The visualization application 216 may be configured to store the captured vehicle data 202 for later viewing. As an example, the visualization application 216 may maintain the captured vehicle data 202 on the nomadic device 53. As another example, the visualization application 216 may provide the captured vehicle data 202 to a remote server 222 for storage. In some cases, the stored captured vehicle data 202 may be automatically labeled according to the location and/or time of the vehicle 31 run (e.g., according to start time, according to location and start time, according to end time, etc.). In other cases, the visualization application 216 may receive a name for the vehicle 31 run via from the user (e.g., via a user interface of the nomadic device 53, via the vehicle HMI 214, etc.). Using the stored vehicle data 202, a driver may be able to view information, such as how many Gs were pulled in a certain turn, or compare vehicle 31 runs to determine whether vehicle 31 performance modifications had a desired effect.

Figure 3A:
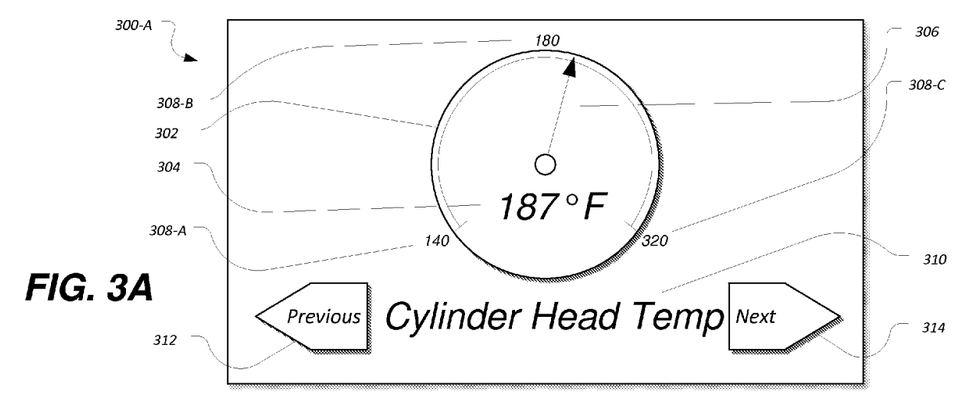
FIG. 3A illustrates an exemplary user interface of a vehicle gauge displaying vehicle data.

FIG. 3A illustrates an exemplary user interface 300-A of a vehicle gauge 302 displaying vehicle data 202. For example, the visualization application 216 may be configured to provide the user interface 300-A to the vehicle HMI 214. The vehicle gauge 302 may include one or more visualizations of the element of vehicle data 202 being displayed. As an example, the vehicle gauge 302 may include a value control 304 including the current value of the element of vehicle data 202, formatted according to the data element parameters 218. As another example, the vehicle gauge 302 may include a representation simulating the look of an analog vehicle 31 gauge, having a value indication 306 (e.g., a pointer needle) drawn at a location corresponding to the value of the element of vehicle data 202 along a range appropriate for the value according to the data element parameters 218. The range may also be illustrated, for example, by one or more range value 308-A, 308-B, 308-C (collectively 308) placed along a scale of the range.

The user interface 300-A may further include a data element identifier 310 of the current element of vehicle data 202 being displayed by the vehicle gauge 302, named according to the data element parameters 218. As illustrated, the data element identifier 310 indicates that the user interface 300-A is configured to display cylinder head temperature. The user interface may also include one or more element selection controls configured to allow the user to select which element of vehicle data 202 to be displayed by the vehicle gauge 302. For instance, the user interface 300-A may include a previous control 312 and a next control 314, configured to allow a user to cycle from a set of available data element parameters 218 describing the possible elements of vehicle data 202.

Figure 3B:
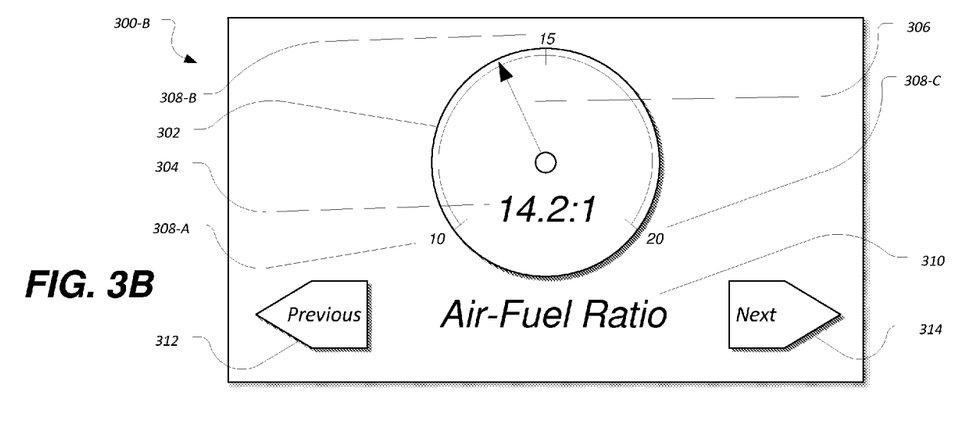
FIG. 3B illustrates an alternate exemplary user interface of the vehicle gauge displaying vehicle data.

FIG. 3B illustrates an alternate exemplary user interface 300-B of the vehicle gauge 302 displaying vehicle data 202. As indicated by the data element identifier 310, the vehicle gauge 302 of the user interface 300-B is configured to display an air-fuel ratio for the vehicle 31, rather than the cylinder head temperature as displayed in the user interface 300-B. Moreover, the value control 304, value indication 306 and range value 308 have also been updated to reflect the updated selection of the air-fuel data element parameter 218. The element of vehicle data 202 is being displayed may have been changed, for example, responsive to user selection of the previous control 312 or the next control 314.

Figure 4:
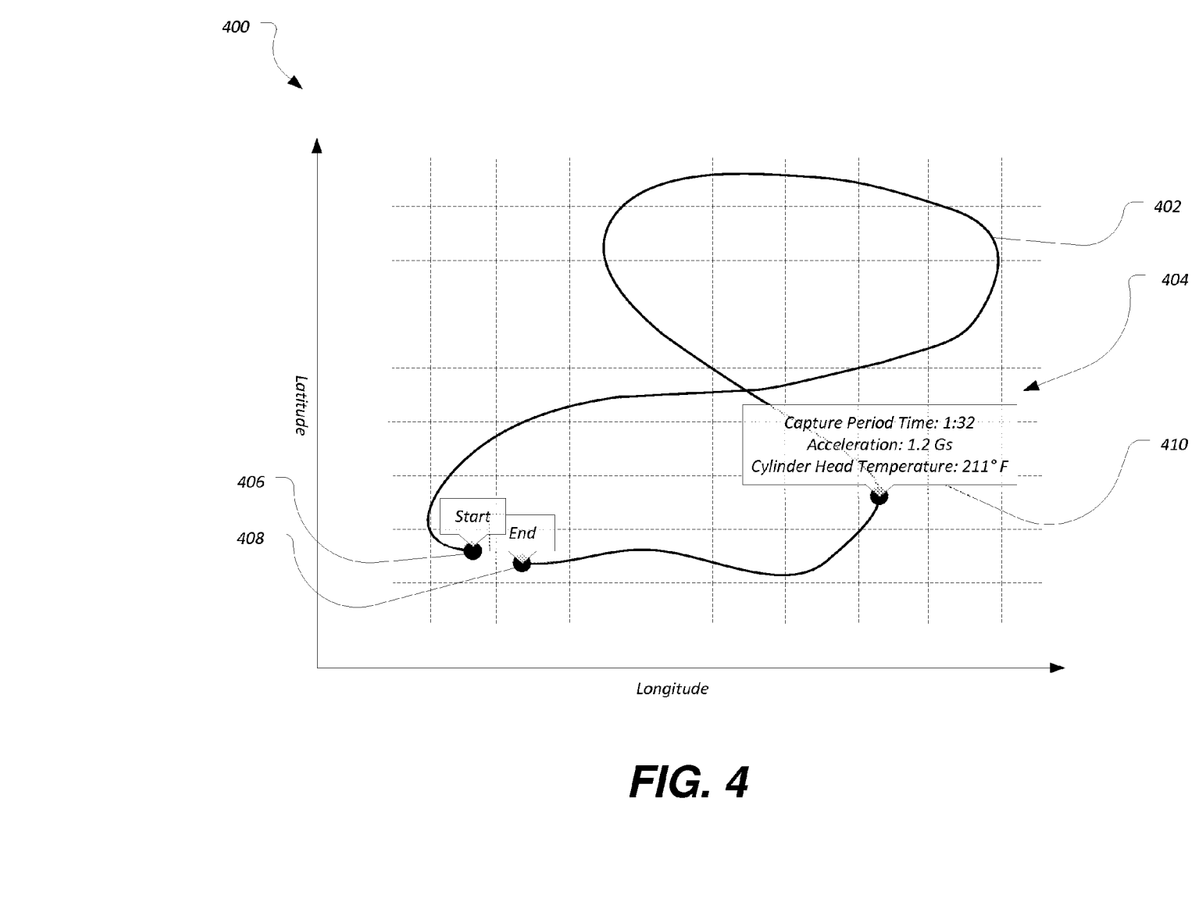
FIG. 4 illustrates an exemplary user interface of vehicle data captured during a vehicle run.

FIG. 4 illustrates an exemplary user interface 400 of vehicle data 202 captured during a vehicle 31 run. The user interface 400 may be displayed, for example, by the visualization application 216 or by another application having access to the captured vehicle data 202, such as a web application in communication with a server hosting the captured vehicle data 202. As illustrated, a path 402 taken by the vehicle 31 during a capture period from a start location to an end location is illustrated on a map 404 of the user interface 400. The start location of the path 402 may be illustrated in the user interface 400 by a start indication 406, and the end location of the path 402 may be illustrated in the user interface 400 at an end indication 408.

The user interface 400 may be further configured to display elements of vehicle data 202 captured by the visualization application 216 during the capture period. For instance, a vehicle data indication 410 may be configured to display elements of vehicle data 202 at a user-specified time along the capture period. In an example, the user interface 400 may include controls or other inputs to allow the user to change the user-specified time along the capture period (e.g., move forward and backward in time), to allow the user to see the elements of vehicle data 202 as they vary during the capture period.

In another example, the user interface 400 may be configured to display elements of vehicle data 202 captured by the visualization application 216 during multiple vehicle runs (not shown). For instance, the In such an example, a user of the system may be able to view differences between runs, such as whether vehicle performance modifications had a desired effect.

Figure 5:
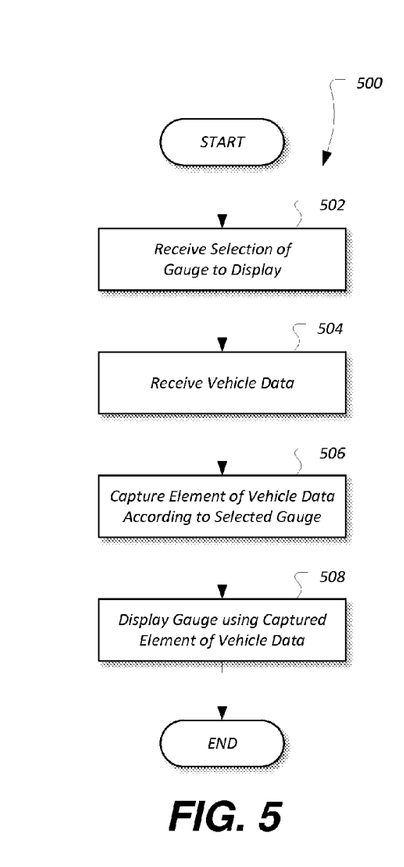
FIG. 5 illustrates an exemplary process for displaying an element of vehicle data in a vehicle gauge.

FIG. 5 illustrates an exemplary process 500 for displaying an element of vehicle data 202 in a vehicle gauge 302. The process 500 may be performed, for example, by the visualization application 216 of the nomadic device 53 configured to receive vehicle data 202 via the data bridge adapter 210 for display in the vehicle HMI 214 by the VCS 1.

At operation 502, the visualization application 216 receives selection of a data element parameter 218 to be displayed in the vehicle gauge 302. For example, the visualization application 216 may receive selection of a desired data element parameter 218 via controls of the user interface 300, such as the previous control 312 or the next control 314.

At operation 504, the visualization application 216 receives the vehicle data 202. For example, the visualization application 216 may receive the vehicle data 202 via the data bridge adapter 210 from the vehicle network 204.

At operation 506, the visualization application 216 captures the selected element of vehicle data 202 according to the data element parameter 218 information. For example, the data element parameter 218 information for the selected element of vehicle data 202 may include data element parameters 218 including a definition of where the element of vehicle data 202 appears in the vehicle data 202, and the visualization application 216 may be configured to utilize the definition to identify the selected vehicle data 202 from the format of the proper messages provided over the vehicle network 204.

At operation 508, the visualization application 216 displays the captured element of vehicle data 202 in the vehicle gauge 302. The visualization application 216 may be configured to use the data element parameters 218 to display the captured element of vehicle data 202 in a format and scale appropriate for the selected element. As an example, the visualization application 216 may display the captured element of vehicle data 202 via a user interface such as the user interface 300-A or the user interface 300-B. After operation 508, the process 500 ends.

Figure 6:
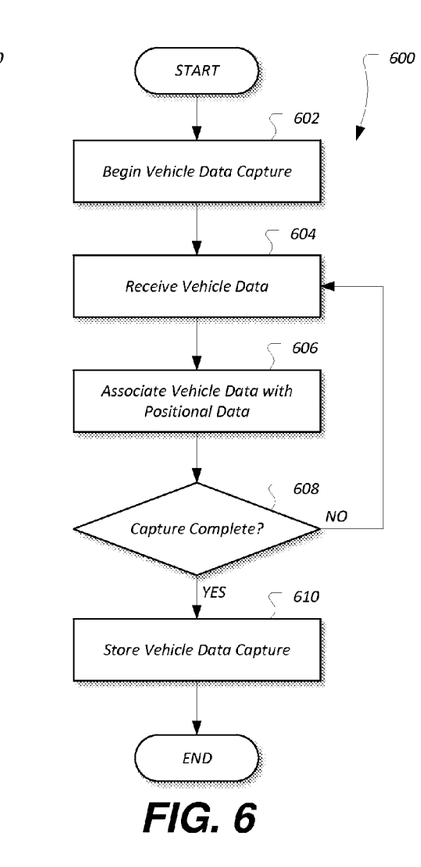
FIG. 6 illustrates an exemplary process for capturing vehicle data during a vehicle run.

FIG. 6 illustrates an exemplary process 600 for capturing vehicle data 202 during a vehicle 31 run. As with the process 500, the process 600 may be performed, for example, by the visualization application 216 of the nomadic device 53 configured to receive vehicle data 202 via the data bridge adapter 210 for display in the vehicle HMI 214 by the VCS 1.

At operation 602, the visualization application 216 begins the capture of the vehicle data 202. For example, the visualization application 216 may receive an indication from the user of the start of a vehicle 31 run (e.g., via a button press, voice command, or other input to the vehicle 31 HMI). Responsive to the indication, the visualization application 216 may set the visualization application 216 into a data capture mode in which vehicle data 202 is captured.

At operation 604, the visualization application 216 receives the vehicle data 202. For example, the visualization application 216 may receive the vehicle data 202 via the data bridge adapter 210 from the vehicle network 204.

At operation 606, the visualization application 216 associates the vehicle data 202 with positional data. For example, the visualization application 216 may monitor the current location of the vehicle 31 (e.g., as determined according to GPS information available to the visualization application 216) and may associate the monitored current location information as well as current time information with the captured vehicle data 202. In some cases, the current time information may be the current time of day, while in other cases, the current time information may be an offset amount of time into the vehicle 31 run. The visualization application 216 may be further utilize elements of the vehicle data 202 to augment the association of location information with the vehicle data 202. For instance, the visualization application 216 may utilize vehicle speed, heading, and/or acceleration information to improve the precision of locations to be associated with the vehicle data 202. In some cases, the visualization application 216 may also associate the vehicle data 202 with other data, such as audio or video data captured 212 by the nomadic device 53 or captured by or input to the data bridge adapter 210.

At operation 608, the visualization application 216 determines whether the capture of vehicle data 202 is complete. For example, the visualization application 216 may determine whether the visualization application 216 has received an indication from the user of the end of a vehicle 31 run (e.g., via a button press, voice command, or other input to the vehicle HMI 214). Responsive to the indication, the visualization application 216 may reset the visualization application 216 out of the data capture mode in which vehicle data 202 is captured. If the visualization application 216 has not received the indication from the user of the end of a vehicle 31 run, control passes to operation 604. If the visualization application 216 has received the indication from the user of the end of a vehicle 31, control passes to operation 610.

At operation 610, the visualization application 216 stores the captured vehicle data 202. As an example, the visualization application 216 may maintain the captured vehicle data 202 on the nomadic device 53. As another example, the visualization application 216 may provide the captured vehicle data 202 to a remote server 222 for storage. In some cases, the stored captured vehicle data 202 may be automatically labeled according to the location and/or time of the vehicle 31 run (e.g., according to start time, according to location and start time, according to end time, etc.). In other cases, the visualization application 216 may receive a name for the vehicle 31 run via from the user (e.g., via a user interface of the nomadic device 53, via the vehicle HMI 214, etc.). After operation 610, the process 600 ends.

Figure 7:
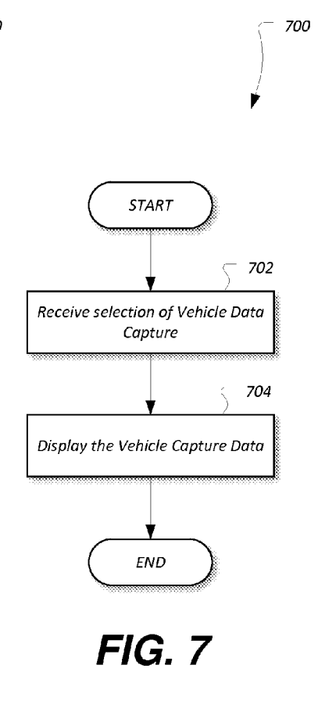
FIG. 7 illustrates an exemplary process for displaying vehicle data from a captured vehicle run.

FIG. 7 illustrates an exemplary process 700 for displaying vehicle data 202 from a captured vehicle 31 run. As with the processes 500 and 600, the process 700 may be performed, for example, by the visualization application 216 of the nomadic device 53 configured to receive vehicle data 202 via the data bridge adapter 210 for display in the vehicle HMI 214 by the VCS 1. In other examples, the process 700 may be performed by another application configured to view vehicle data 202.

At operation 702, the visualization application 216 receives a selection of one or more captures of vehicle data 202. For example, the visualization application 216 may query storage of the nomadic device 53 or the remote server 222 for a listing of stored vehicle data 202. The visualization application 216 may further display a user interface including the listing of stored vehicle data 202, and receive a selection from the listing of one or more stored vehicle data 202 instances to present.

At operation 704, the visualization application 216 displays the selected capture or captures of vehicle data 202. Accordingly, the visualization application 216 may provide a user interface, such as the user interfaces 400, including the vehicle data 202 captured during a vehicle 31 run. After operation 704, the process 700 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a nomadic device connected to a vehicle computing system (VCS) and configured to
  display, via the VCS, at least one element selection control configure to allow a user to select which element of vehicle data is to be displayed by a gauge,
  receive an indication of the element of vehicle data to be displayed by the gauge responsive to user input to the at least one element selection control,
  identify data element parameter information associated with the gauge to be displayed according to the indication,
  capture, using a data bridge adapter connected to a vehicle network, an element of vehicle data according to the data element parameter information, and
  display, via the VCS, the gauge including the element of vehicle data formatted according to the data element parameter information.

2. The system of claim 1, wherein the vehicle network includes a controller-area network.

3. The system of claim 1, wherein the VCS is configured to receive filtered vehicle data from the vehicle network via a telematics data gateway, and the element of vehicle data is filtered out of the filtered vehicle data by the telematics data gateway.

4. The system of claim 1, wherein the nomadic device is further configured to
 capture, using a data bridge adapter connected to a vehicle network, a plurality of elements of the vehicle data according to the data element parameter information,
 associate the plurality of elements of the vehicle data with positional information, and
 store the plurality of elements of the vehicle data in association with the positional information as a vehicle run.

5. The system of claim 4, wherein the nomadic device is further configured to store the plurality of elements of the vehicle data by uploading the plurality of elements of the vehicle data to a remote server.

6. The system of claim 4, wherein the nomadic device is further configured to associate the plurality of elements of the vehicle data with positional information according to global positioning information received from at least one of a global positioning data receiver of the nomadic device and global positioning data receiver of the vehicle.

7. The system of claim 6, wherein the nomadic device is further configured to utilize elements of the plurality of elements of the vehicle data including at least one of speed, heading, and acceleration to improve accuracy of the positional information determined according to the global positioning information.

8. The system of claim 4, wherein the nomadic device is further configured to augment the plurality of elements of the vehicle data with at least one of audio data and video data captured by the nomadic device.

9. The system of claim 4, wherein the nomadic device is further configured to associate the plurality of elements of the vehicle data with a label based on a time and a location of capture of the vehicle data.

10. The system of claim 4, wherein the nomadic device is further configured to:
 receive a selection of the plurality of elements of the vehicle data from a listing of stored vehicle data, and
 display the plurality of elements of the vehicle data in a user interface.

11. A system comprising:
 a vehicle user interface, and
 a vehicle computing system (VCS) configured to:
  receive an indication of a gauge to be displayed via the user interface, receive vehicle data from a nomadic device in communication with a data bridge adapter connected to a vehicle network, identify data element parameter information associated with an element of the vehicle data for the gauge, and display the gauge including the element of the vehicle data to the user interface, formatted according to the data element parameter information.

12. The system of claim 11,
wherein the (VCS) is further configured to:
receive filtered vehicle data from a telematics gateway configured to provide a subset of vehicle data provided over a vehicle network,
and
utilize the vehicle data to provide information via the VCS unavailable via the filtered vehicle data.

13. The system of claim 11, wherein the vehicle network includes a controller-area network.

14. The system of claim 11, wherein the data element parameter information specifies formatting information including at least one of a name of the element of the vehicle data to include in the user interface, a display range of values for the element, a warning level above or below which the user interface should display a warning for the element, and a unit of measure in which to present the element in a user interface.

15. The system of claim 11, wherein the data element parameter information specifies data element information including at least one of a definition of where the element appears in the vehicle data and in what data format the element appears in the vehicle data.

16. The system of claim 11, wherein the VCS is further configured to:
provide a start indication to the nomadic device to begin capture of the vehicle data via the data bridge adapter, and
provide an end indication to the nomadic device to stop the capture of the vehicle data via the data bridge adapter.

17. A method comprising:
receiving, via a user interface of a vehicle, an indication of a gauge to be displayed;
receiving vehicle data from a nomadic device in communication with a data bridge adapter connected to a vehicle network;
identifying data element parameter information associated with an element of the vehicle data; and
displaying the gauge including the element of the vehicle data to the user interface, formatted according to the data element parameter information.

18. The method of claim 17, wherein the data element parameter information specifies formatting information including at least one of a name of the element of the vehicle data to include in the user interface, a display range of values for the element, a warning level above or below which the user interface should display a warning for the element, and a unit of measure in which to present the element in a user interface.

19. The method of claim 17, wherein the data element parameter information specifies data element information including at least one of a definition of where the element appears in the vehicle data and in what data format the element appears in the vehicle data.

* * * * *